United States Patent [19]

Kozaki et al.

[11] Patent Number: 4,892,329
[45] Date of Patent: Jan. 9, 1990

[54] STABILIZER CONTROL APPARATUS FOR USE IN MOTOR VEHICLES

[75] Inventors: Tetsuji Kozaki; Mamoru Shimamoto, both of Nagoya; Toshio Oonuma, Susono, all of Japan

[73] Assignees: Nippondenso Co., Ltd.; Kariya and Toyota Jidosha Kabushiki Kaisha, both of Toyota, Japan

[21] Appl. No.: 273,533

[22] Filed: Nov. 21, 1988

[30] Foreign Application Priority Data

Nov. 19, 1987 [JP] Japan .................. 62-292568

[51] Int. Cl.$^4$ ............................................. B62D 9/02
[52] U.S. Cl. .................................. 280/772; 280/700; 280/723; 280/689
[58] Field of Search ............... 280/772, 689, 723, 700

[56] References Cited

U.S. PATENT DOCUMENTS

| | | | |
|---|---|---|---|
| 4,066,278 | 1/1978 | Takagi | 280/710 |
| 4,206,935 | 6/1980 | Sheppard et al. | 280/723 |
| 4,218,072 | 8/1980 | Wallis | 280/689 |
| 4,429,899 | 2/1984 | Ohno | 280/689 |
| 4,613,153 | 9/1986 | Shibahata et al. | 280/689 |
| 4,641,856 | 2/1987 | Reichenbach | 280/772 |
| 4,804,198 | 2/1989 | Imai et al. | 280/772 |

FOREIGN PATENT DOCUMENTS 51-131024  11/1976  Japan .
61-64514   4/1986   Japan .
61146612   7/1986   Japan .
2006131    5/1979   United Kingdom .

Primary Examiner—Kenneth R. Rice
Attorney, Agent, or Firm—Cushman, Darby & Cushman

[57] ABSTRACT

A control apparatus for controlling the twisting amount of a stabilizer provided between left and right wheels of a vehicle in accordance with the vehicle running state. The control apparatus includes a hydraulic cylinder unit coupled between one end portion of the twistable stabilizer and one of the wheels and the cylinder unit has a cylinder body and a piston slidable therein to be expandable and contractable in accordance with movements of the piston. Also included in the apparatus is a hydraulic actuator comprising control valves and coupled to the cylinder unit to control a position of the piston, the position thereof corresponding to the twisting amount of the stabilizer and being detectable by a position sensor. A control unit determines a predetermined stable condition of the vehicle on the basis of a steering angle of a steering wheel, which is detectable by a steering sensor, and obtains a neutral position of the piston taken under the condition that the vehicle is in the predetermined stable condition. Further, the control unit determines a turning state of the vehicle on the basis of the steering angle and to determine a target piston position with respect to the neutral position in accordance with the degree of the vehicle turning state, then outputting a control signal to the actuator so that the piston assumes the target piston position.

5 Claims, 6 Drawing Sheets

STABILIZER CONTROL APPARATUS FOR USE IN MOTOR VEHICLES

BACKGROUND OF THE INVENTION

The present invention relates generally to stabilizers for use in motor vehicles, and more particularly to a stabilizer control apparatus for accurately and surely controlling the stabilizers during such conditions as turning of the motor vehicle in order to ensure comfortable and stable vehicle running.

Motor vehicles are generally equipped with stabilizers in order to reduce inclination and rolling of the vehicle bodies during such running conditions as turning and irregular-road-running of the motor vehicles. An important problem arising in the use of the stabilizers is, however, that the stabilizer is coupled between a left-side wheel and a right-side wheel of the motor vehicle so as to restrict the independent movements of the left-side wheel and right-side wheel to make greater vibration of the motor vehicle, thereby resulting in incomfortable ride of the motor vehicle. In order for removing such a problem a control apparatus for allowing control of the twisting force of the stabilizer has been proposed such as is disclosed in Japanese Patent provisional Publication No. 61-146612, in which the twisting-force control is performed in accordance with a turning lateral acceleration estimated as a function of wheel speeds and steering amount of the motor vehicle. However, such a prior art control apparatus is required to determine a reference position of a hydraulic-pressure operable piston in a cylinder used for twisting the stabilizer and the appropriate determination of the reference position thereof is difficult because of being greatly varied in accordance with the loading states of the motor vehicle, thereby causing unstable movement of the motor vehicle in conditions such as vehicle turning.

SUMMARY OF THE INVENTION

It is therefore an object of the present invention to provide a stabilizer control apparatus which is capable of ensuring stable and comfortable driving of a motor vehicle irrespective of turning of the motor vehicle and variation of the loading state thereof.

A control apparatus of the present invention is arranged to control the twisting amount of an elastically twistable stabilizer provided between at least a left-side wheel and a right-side wheel. The control apparatus includes hydraulic pressure cylinder unit means coupled between one end portion of the elastically twistable stabilizer means and one of the left-side and right-side wheels, the hydraulic pressure cylinder unit means having at least one cylinder body and one piston dividing the space within the cylinder body into two chambers and slidably movable in the cylinder body so as to be expandable and contractable in accordance with slidable movements of the piston. The hydraulic pressure cylinder unit means coupled to hydraulic pressure actuator means including change-over valve means and coupled between a hydraulic pressure generator means and the hydraulic pressure cylinder unit means to control hydraulic pressures in the two chambers of the cylinder body using the hydraulic pressure generated by the hydraulic pressure generator means so as to allow adjusting a position of the piston, the position of the piston in the cylinder body determining the twisting amount of the stabilizer means. Also included in the apparatus are steering angle sensor means for sensing a steering angle of the motor vehicle in response to a rotational movement of a steering wheel of the motor vehicle to generate a signal indicative of the sensed steering angle and position sensor means adapted for sensing the position of the piston in the cylinder body to generate a signal indicative of the sensed piston position. First control means is responsive to the steering angle signal and the position signal therefrom to determine a predetermined stable condition of the motor vehicle on the basis of the steering angle signal and to obtain a neutral position of the piston taken under the condition that the motor vehicle is in the predetermined stable condition, the neutral position thereof being sensed by the position sensor means. Furthermore, second control means is responsive to the steering angle signal to determine a turning state of the motor vehicle on the basis of the steering angle signal and to determine a target piston position with respect to the obtained neutral position of the piston in accordance with the degree of the vehicle turning state, determined by the steering angle signal, in response to the determination of the vehicle turning state, the second control means outputting a control signal to the hydraulic pressure actuator means so that the piston is controlled to assume the determined target piston position.

Preferably, the control apparatus further includes vehicle speed sensor means for sensing a speed of said motor vehicle and generating a signal indicative of the sensed vehicle speed, and the first control means determines the predetermined stable condition of the motor vehicle when the motor vehicle is running straight at a predetermined speed. When the motor vehicle is in the predetermined stable condition, the first control means controls the hydraulic pressure actuator means so that the piston of the hydraulic pressure cylinder unit means is freely expandable and contractable within the cylinder body thereof to be finally kept to a stable position which is in turn employed as the neutral position of the piston.

BRIEF DESCRIPTION OF THE DRAWINGS

The present invention will be described in further detail with reference to the accompanying drawings, in which.

DETAILED DESCRIPTION OF THE INVENTION

Figure 1:
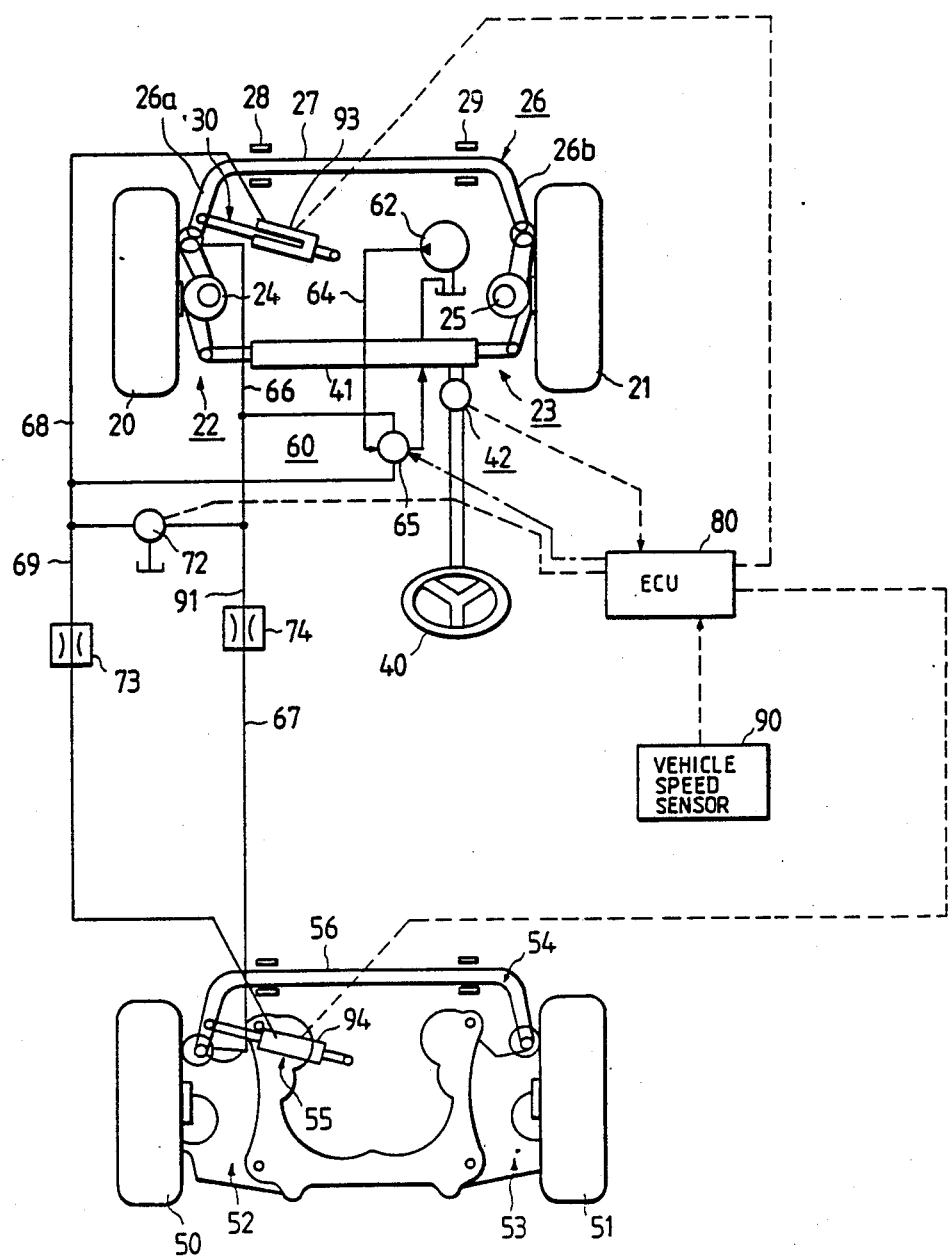
FIG. 1 is a schematical diagram showing the entire arrangement of a stabilizer control apparatus according to an embodiment of the present invention.
Figure 2:
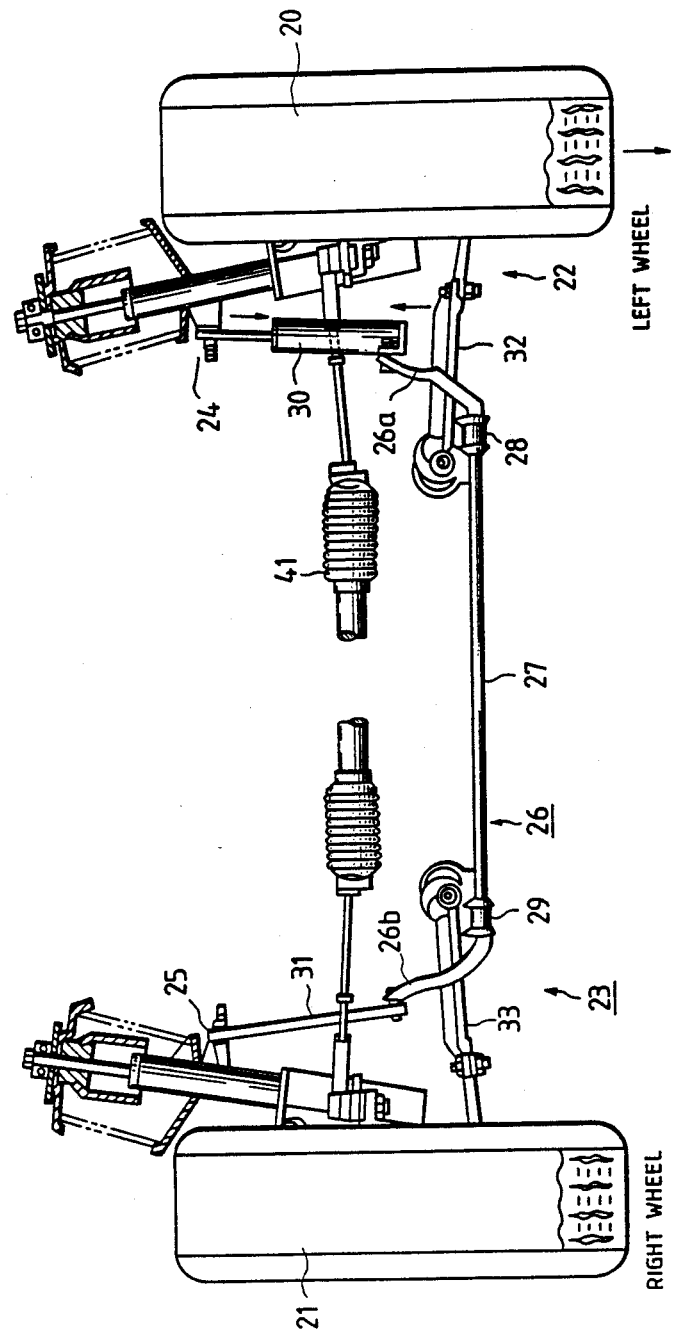
FIG. 2 is an illustration of a stabilizer and a hydraulic pressure cylinder unit provided between a left-side wheel and a right-side wheel in this embodiment.

Referring now to FIG. 1, there is illustrated a stabilizer control apparatus according to an embodiment of the present invention which is incorporated into a motor vehicle having stabilizers between the front-side wheels and the rear-side wheels. In FIG. 2, front-side wheels 20, 21, adapted to be steered through a steering wheel of the motor vehicle, are respectively supported by means of spring lower members 22, 23 which are in turn supported through shock absorbers 24, 25 on a vehicle body. A stabilizer 26 includes an elastically twistable torsion bar 27 which is rotatably supported by rubber bearings 28, 29. One end portion 26a of the stabilizer 26 is coupled to the spring lower member 22 via a hydraulic pressure cylinder unit 30 adapted to allow the adjustment of the connection distance therebetween, the connection length between the one end portion 26a of the stabilizer 26 and the spring lower member 22 being adjustable by expansion and contraction of the hydraulic pressure cylinder unit 30. The other end portion of the stabilizer 26 is fixedly secured to the other spring lower member 23. For example, as shown in FIG. 2, the one end portion 26a of the stabilizer 26 is coupled through the hydraulic pressure cylinder unit 30 to a wheel-side fixing portion of the shock absorber 24 and the other end portion 26b thereof is connected through a rod 31 to a wheel-side fixing portion of the shock absorber 25. Here, it is also appropriate that the respective spring lower members 22, 23 coupled to both the end portions 26a, 26b of the stabilizer 26 are lower arms illustrated at numerals 32, 33. To the spring lower members 22, 22 is coupled a steering mechanism 41 which is operatively coupled to a steering wheel 40 for steering operation. The steering angle of the steering wheel 40 is detected by a steering angle sensor 42. As well as the front-side wheels 20, 21, the rear-side wheels 50, 51 are supported by means of spring lower members 52, 53 and connected through appropriate means to the vehicle body. A rear-side stabilizer 54 is at one end portion coupled through a hydraulic pressure cylinder unit 55 to the spring lower member 52 and at the other end portion coupled fixedly to the spring lower member 53. The rear-side stabilizer 54 has a torsion bar 56 whose diameter is smaller as compared with that of the front-side torsion bar 27 so that its rigidity becomes smaller than that of the front-side torsion bar 27.

Figure 3:
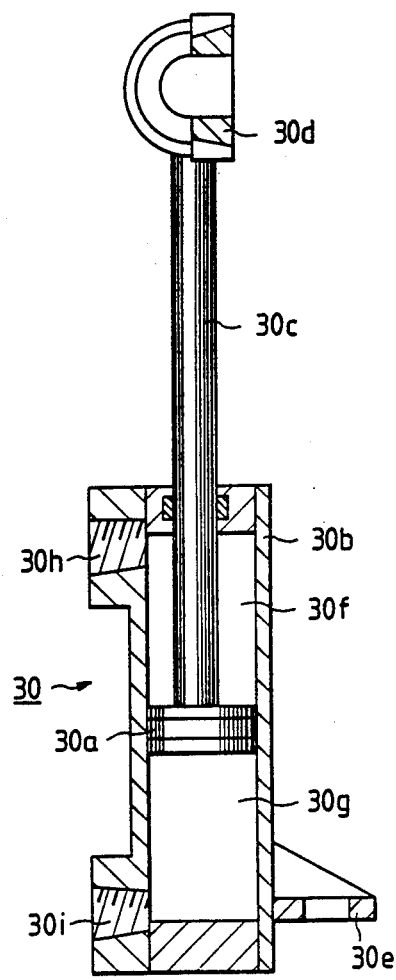
FIG. 3 is a cross-sectional view of the hydraulic pressure cylinder unit.

The hydraulic pressure cylinder unit 30, as shown in FIG. 3, comprises a cylinder body 30b and a piston 30a which is oil-tightly slidable in the cylinder body 30b. The piston 30a is fixedly secured to a rod 30c and coupled through fitting portion 30d to the shock absorber 24 and the cylinder body 30b is connected through a fitting portion 30e to the stabilizer 26. The inside of the cylinder body 30b is divided by the piston 30a into an upper chamber 30f and a lower chamber 30g which are respectively communicated through ports 30h, 30i with a fluid-supply device (which is a hydraulic pressure circuit illustrated at numeral 60 in FIG. 1). Thus, when a hydraulic pressure is supplied through the port 30i to the lower chamber 30g, the pressurized oil in the upper chamber 30f is discharged through the port 30h whereby the distance between the fitting portions 30d, 30e of the cylinder unit 30 is lengthened. On the other hand, in response to supply of a hydraulic pressure to the upper chamber 30f through the port 30h, the distance therebetween is shortened. The rear-side hydraulic pressure cylinder unit 55 has the same arrangement as the above-mentioned front-side cylinder unit 30.

Figure 4:
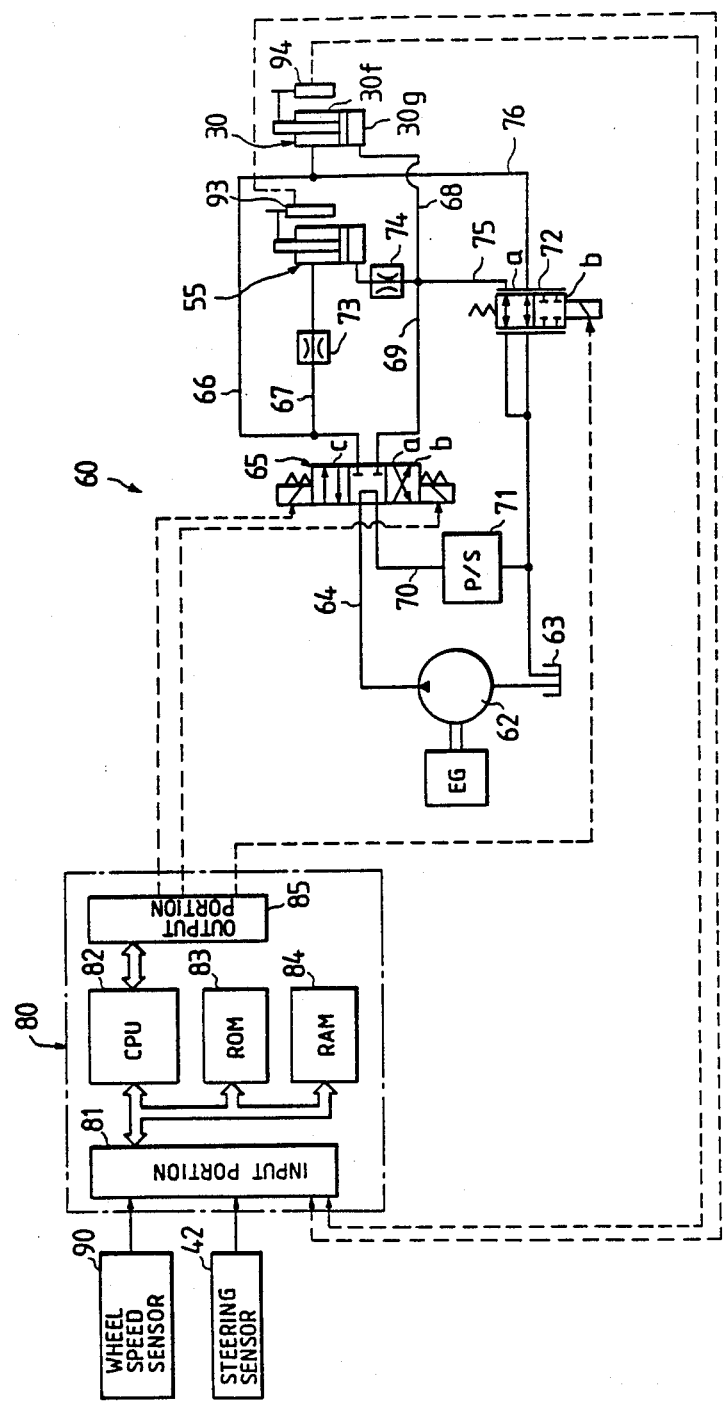
FIG. 4 is an illustration of a hydraulic pressure circuit used in the stabilizer control apparatus of this embodiment.

The hydraulic pressure circuit 60, comprising a hydraulic pressure pump 62, a four-port and three-position solenoid-operated change-over control valve 65, a flow-rate control valve 72, restrictions 73, 74 and so on, will be described hereinbelow with reference to FIG. 4. In FIG. 4, the hydraulic pressure pump 62 driven through an output shaft of an engine designated by character EG draws oil from a reservoir 63 and supplies it through a passage 64, the change-over valve (four-port and three-position solenoid-operated change-over control valve) 65 and passages 66 to 69 to the front-wheel side hydraulic pressure cylinder unit 30 and the rear-wheel side hydraulic pressure cylinder unit 55, and additionally supplies it through passages 64, 70 to a power steering device 71 for auxiliary power supply of a steering mechanism 41. The upper and lower chambers 30f, 30g are communicated through the flow-rate control valve 72 with each other and communicated with the reservoir 63. The restrictions 73, 74 are provided in the passages 67, 69 disposed from the change-over valve 65 to the rear-wheel side hydraulic pressure cylinder unit 55.

The change-over valve 65 and flow-rate control valve 72 operates in response to control signals from an electronic control unit (ECU) 80. The change-over valve 65 is adapted to assume a first position (neutral mode) illustrated at character a, a second position (expansion mode) designated by character b and a third position (contraction mode) illustrated at character c. On the other hand, the flow-rate control valve 72 can be arranged to selectively take a position between a first position (communication mode) illustrated at character a and a second position (shut-off mode) designated by character b. This flow-rate control valve 72 allows to successively vary the flow rate by changing the valve opening area from the full-opening state to the full-closed state.

The electronic control unit (ECU) 80 comprises a microcomputer or the like, including an input portion 81 for receiving the output signals of various sensors of this apparatus, a central processing unit (CPU) 82 for performing calculations on the basis of the signals inputted in the input portion 81, a memory portion (ROM) 83 for storing programs and so on for the control calculations, a memory portion (RAM) 84 for temporarily storing the calculation results, control states and so on, and an output portion 85 for outputting control signals to the valves 65, 72 in accordance with the calculation results. The input portion 81 is coupled to a vehicle-wheel speed sensor 90 for detecting speeds of the vehicle wheels, the steering sensor 42 for detecting the steering angle and steering direction of the steering wheel 40, stroke sensors 93, 94 for detecting the amounts of the expansion and contraction of the front-side and rear-side hydraulic pressure cylinder units 30, 55. The vehicle-wheel speed sensor 90 may be arranged to be attached to the output shaft of the transmission so as to measure the average speed of the left-side and right-side driven wheels.

A description will be given in terms of operation based upon the above-mentioned arrangement. The first description is started for a mechanical operation of the stabilizer control apparatus in the case of an actual vehicle running.

Straight Running State

With the motor vehicle running straight at a low speed, the change-over valve 65 is set to the neutral mode (position a) and the flow-rate control valve 72 is set to the communication mode (position a), whereby the pressurized oil from the hydraulic pressure pump 62 is supplied through the passages 64, 70 to only the power steering device 71, but not supplied to the front-side and rear-side hydraulic pressure cylinder units 30, 55. On the other hand, the flow-rate control valve 72, being set to the communication mode, provides a condition that the upper chambers 30f and lower chambers 30g of the front-side and rear-side hydraulic pressure cylinder units 30, 55 are communicated through the passages 66 to 69, 75, 76 with each other. Therefore, in these modes, the pistons 30a of the hydraulic pressure cylinder units 30, 55 are freely slidable in the cylinder bodies 30b. That is, the twisting forces from the stabilizers 26, 54 are directly transferred to the pistons 30a of the hydraulic pressure cylinder units 30, 55, thereby resulting in the state that the twisting rigidities of the stabilizers 26, 54 scarcely occur.

Turning Travelling State

When the steering angle is small and the vehicle speed is low, the change-over valve 65 is kept to the neutral mode and the flow-rate control valve 72 is controlled from the full-opening state to the full-closed state in accordance with increase in the vehicle speed and steering angle so that the stabilizers 26, 54 generate twisting rigidities to make stable the travelling state of the motor vehicle on turning.

On the other hand, when on right or left turning the steering angle or the vehicle speed is large or high, the change-over valve 65 is switched to assume the expansion mode or contraction mode. Furthermore, the flow-rate control valve 72 is controlled to take a predetermined middle-closed state in accordance with the degrees of the vehicle speed and steering angle. That is, in the expansion mode, the pressurized oil from the hydraulic pressure pump 62 is supplied through the passages 64, change-over valve 65, passages 69, 68 and restriction 74 to the lower chambers 30g of the hydraulic pressure cylinder units 30, 55 and so on, and a portion thereof returns through the passage 75 and flow-rate control valve 72 to the reservoir tank 63. The ratio of supply to the hydraulic pressure cylinder units 30, 55 and the reservoir tank 63 is determined by the controlled state (opening area) of the flow-rate control valve 72. Furthermore, the pressurized oil in the upper chambers 30f thereof is discharged through the passages 66, 67, restriction 73, change-over valve 65 and power steering devices 70, 71 into the reservoir 63, and a portion thereof is discharged through the passage 76 and flow-rate control valve 72 thereinto. At this time, the ECU 80 controls the flow-rate control valve 72 so that the detection values of the stroke sensors 93, 94 become equal to target stroke values, and the pistons 30a are fixed to target stroke positions with the reaction forces of the stabilizers 26, 54 being balanced with the pressure due to the oil supply from the hydraulic pressure pump 62.

With the expansion, on the left turning of the motor vehicle, the twisting rigidity to the stabilizer 26 is positively generated to reduce the roll angle of the vehicle body. On the other hand, on right turning, the change-over valve 65 is switched to the contraction mode so that the pressurized oil from the hydraulic pressure pump 62 is supplied through the passage 64, change-over valve 65, passages 66, 67 and restriction 73 to the upper chambers 30f of the hydraulic pressure cylinder units 30, 55 and a portion thereof returns through the passage 76 and flow-rate control valve 72 to the reservoir 63. Furthermore, the pressurized oil in the lower chambers 30g is discharged through the passages 68, 69, restriction 74, change-over valve 65, passage 70 and power steering device 71 to the reservoir 63 and a portion thereof is discharged through the flow-rate control valve 72 thereto. As well as the expansion mode, the piston is fixed to the target stroke position in accordance with the force-balancing relation, whereby on the right turning the hydraulic pressure cylinder units 30, 55 are set to assume the contraction states so as to positively generate the twisting rigidity in the reverse direction to reduce the roll angle. Here, although in the above description the hydraulic pressure cylinder units 30, 55 are mounted on the left side portion of the motor vehicle, in the case that the hydraulic pressure cylinder units 30, 55 are provided at the right side of the motor vehicle, the expansion and contraction of the cylinder units 30, 55 becomes in opposite relation to the left-side mounting case. This case results in the same roll-reducing effect.

Since this apparatus is arranged to position-control the piston 30a from the neutral position in response to vehicle turning, it is required to determine the neutral position of the piston stroke.

The stroke of the piston 30a is directly or indirectly detectable, for example, by providing a sensor in the cylinder body 30b or providing a sensor associated with a link or the like attached thereto. The piston stroke sensor may be arranged to detect the movement direction (expanding direction or contracting direction) of the piston 30a and the movement amount of the piston 30a which is in turn generated as corresponding pulse signal, or arranged to develop a voltage signal corresponding to the position thereof, for example, using a potentiometer or generate a code corresponding thereto. Irrespective of the types of the sensors, as the reference position of the piston 30a in the piston stroke control may be used the most-contracted position thereof.

Figure 5:
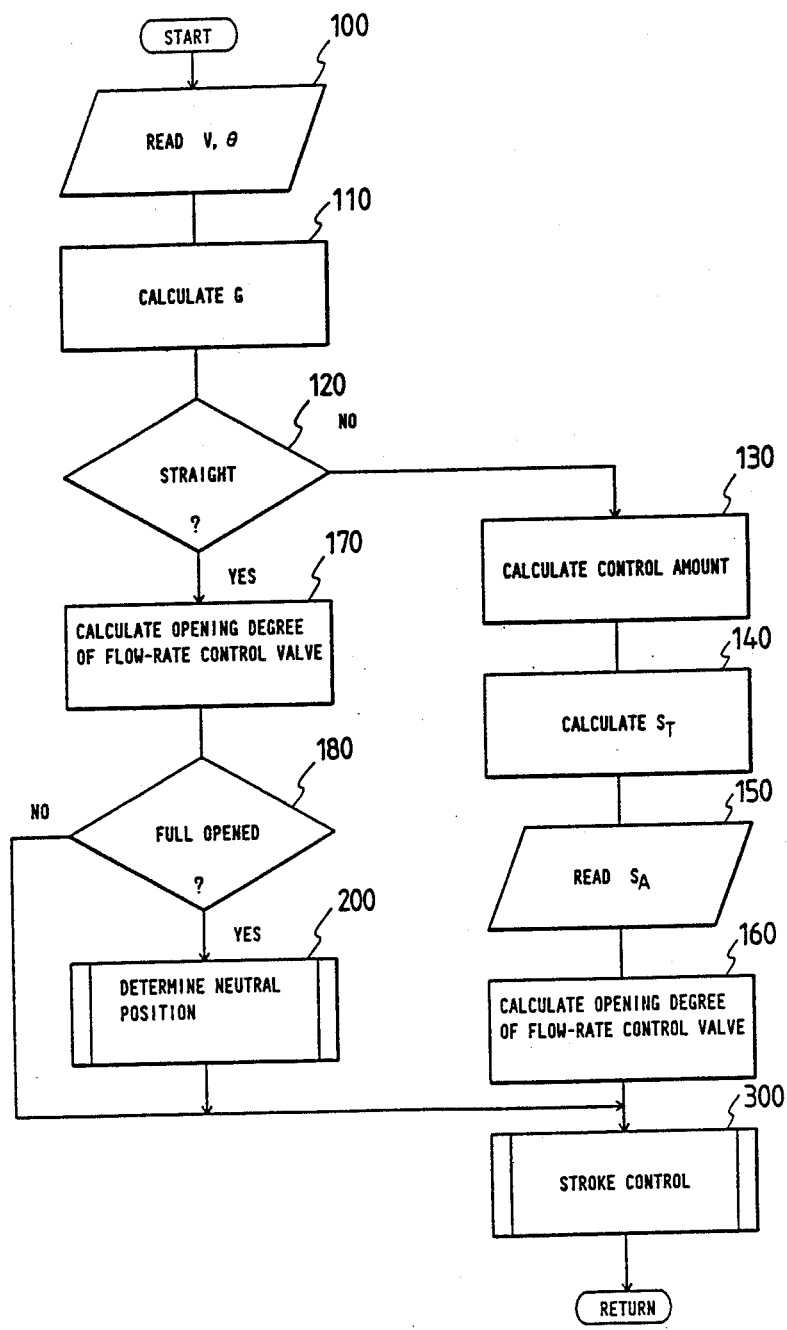
FIGS. 5 and 6 are flow charts showing a control operation executed in the stabilizer control apparatus.
Figure 6:
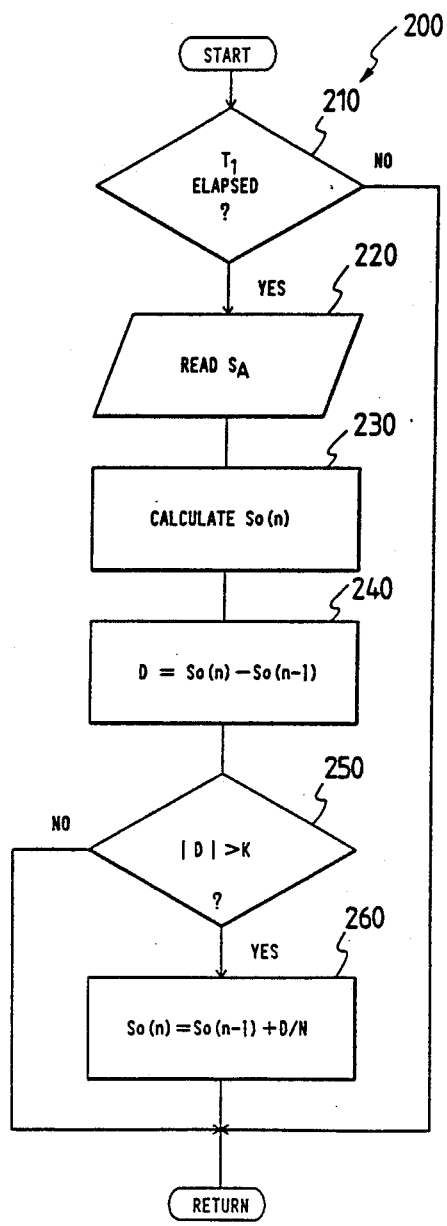

A description will be made hereinbelow in terms of the piston stroke, or movement, control with reference to flow charts of FIGS. 5 and 6 to be executed in the microcomputer of the electronic control unit 80.

The operation is started with a step 100 to read data including a vehicle speed V and a steering angle $\theta$, followed by a step 110 to calculate a turning lateral acceleration G on the basis of the values read in the previous step 100 in accordance with a predetermined equation $G = f(\theta, V)$. A step 120 is then executed in order to determine, in accordance with the result of the step 110, whether the motor vehicle is running straight. That is, when $G=0$, the motor vehicle is determined to be in straight running state. In this case, $G=0$ means predetermined stable conditions, for example, the case of no steering operation, including an idling state that the wheel is not steered irrespective of operation of the steering wheel, or no vehicle running. If not, that is, if the motor vehicle is turning, a step 130 follows to calculate a stroke control amount S on the basis of the obtained lateral acceleration G in accordance with a predetermined equation so as to cancel the rolling of the vehicle. The stroke control amount S is an amount to be moved from the neutral position which will be described hereinafter. Control goes to a step 140 to calculate a target stroke (target piston position) $S_T$. That is, when the currently obtained neutral position is So, in the case that the cylinder units 30, 55 are provided at the left-side portions of the motor vehicle as shown in FIG. 2, the calculation of $S_T$ is performed as $S_T = S_o - S$ under the condition of the right-side steering operation and performed as $S_T = S_o + S$ under the condition of the left-side steering operation. Control further goes to a step 150 to read a present stroke amount $S_A$ due to the hydraulic pressure actuator. Here, it is also appropriate to read $S_A$ before executing the step 120. In this case, a step 220 (FIG. 6) which will be described hereinafter can be omitted. After the execution of the step 150, control advances to a step 160 to calculate the opening degree of the flow-rate control valve 72 on the basis of the difference between $S_T$ and $S_A$ whereby $S_T$ becomes equal to $S_A$. A subsequent step 300 is provided in order to perform the stroke control by operating the solenoid-operated valve in accordance with the calculated control valve 72 opening degree and the direction of the change-over valve 65.

On the other hand, if in the step 120 the motor vehicle is determined to be in a straight running state, a step 170 follows to perform a calculation so as to decrease the opening degree of the flow-rate control valve 72 as the vehicle speed become higher (it is gradually varied from the free state to the holding state), this being for making stable the high-speed straight travelling. This step 170 is performed if required and can be omitted. Subsequently, a step 180 is executed to check whether the control valve 72 is in the full-opening state. The full-opening state of the control valve 72 means that the upper and lower chambers 30f, 30g of the hydraulic pressure cylinder units 30, 55 are communicated with each other and the change-over valve 65 is set to the neutral mode (because the motor vehicle is running straight). That is, the stabilizers 26, 54 are not secured to the vehicle body, i.e., in the free states. In this case, irrespective of shifting of the position of the suspension of the left and right wheels due to unbalanced load resulting from the riding persons, road surface inclination and so on, since the external force is not applied to the stabilizer, the stabilizer is kept to a stable position on straight running and the piston 30a is at the corresponding position in the hydraulic pressure cylinder body 30b. With this position being always used as a reference for control, a sense of incongruity caused by the unbalancing between the left and right side control in a small-steering region in the vicinity of the neutral position can be removed irrespective of occurrance of the unbalanced load.

If in the step 180 the control valve 72 is not full-opened, control proceeds to the step 300 to perform control of the control valve 72 and so on when the motor vehicle is running straight. On the other hand, if in the step 180 the control valve 72 is in the full-opening state, control goes to a step 200 in order to obtain the neutral position of the piston stroke (control reference position), followed by the step 300. The neutral position obtained here will be used for calculation of a target stroke amount in the previously-described step 140 for the next control.

A process of learning of the piston stroke neutral position will be described hereinbelow with reference to a flow chart of FIG. 6. Although the operation shown in FIG. 5 is repeatedly performed at intervals of several msec to scores msec, the variation of the stroke amount in the vicinity of the neutral position occurs at intervals of about 100 msec to several sec, and if the neutral position calculation is made at every execution of the entire processes, the small variation due to projections on a road surface affects the neutral position calculation. Therefore, the neutral position learning calculation is preferable to be performed at every time interval of T1 sec, longer than the time period of the operation of FIG. 5, so as to follow only slow variations such as variation of the riding person load, variation of inclination of the road surface. In the FIG. 6 flow chart, a step 210 is first executed to check whether T1 sec is elasped to effect the process at intervals of T1 sec. That is, the neutral position calculation process is performed at intervals of T1 sec (0<T1) under the conditions that the motor vehicle is running straight, the control valve 72 is controlled to be in the full-opening state and the piston 30a is in the freely moving state. A step 220 follows to read the present actuator stroke amount $S_A(n)$, followed by a step 230 in which the neutral position $So(n)$ is calculated as follows to obtain an average of the values between the present value $S_A(n)$ and the value before several times $S_A(n-m)$, i.e., an average of the previously obtained several values and the currently obtained value.

$$So(n) = \frac{S_A(n) + S_A(n-1) + \ldots + S_A(n-m)}{m+1}$$

Here, since the variation of the neutral position $So(n)$ is considerably slow, the difference between $So(n)$ and $So(n-1)$ is actually small and hence it is possible to directly determine $So(n)$ as the neutral position (reference position for the stroke control). However, in the case where $So(n)$ is greatly different from $So(n-1)$, if $So(n-1)$ is immediately replaced with $So(n)$ to be used as the reference position, discontinuous movement occurs in the rolling directions. In order for removing this problem, control goes to a step 240 to obtain the difference D between $So(n)$ and $So(n-1)$, followed by a step 250 to check whether the absolute value of D is greater than a reference value K. If $|D| \leq K$, $So(n)$ is directly used as a neutral position whereby the learning calculation of the neutral position is terminated. On the other hand, if $|D| > K$, control advances to a step 260 where correction of the neutral position is effected in accordance with the following equation:

$$So(n) = So(n-1) + D/N$$

where N represents a predetermined value for preventing So from being rapidly varied.

Here, the processes between the steps 240 to 260 are performed for preventing the reference position from being greatly varied and the control from becoming unstable, in the case where the difference D between $So(n)$ and $So(n-1)$ becomes great, for example, when only one wheel is dropped down into a large recess of the vehicle running road surface or when the vehicle running road surface is extremely irregular.

Figure 7:
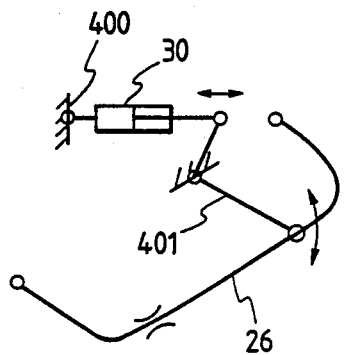
FIG. 7 shows another arrangement for the stabilizer and the hydraulic pressure cylinder unit.

It should be understood that the foregoing relates to only a preferred embodiment of the invention, and that it is intended to cover all changes and modifications of the embodiment of the invention herein used for the purposes of the disclosure, which do not constitute departures from the spirit and scope of the invention. For example, although in the above description the front-side and rear-side stabilizers are controlled, it is possible to control one of the front-side and rear-side stabilizers. Furthermore, although in the above-description the hydraulic pressure cylinder unit is provided between the spring lower member and the stabilizer to directly provide a twisting action to the stabilizer, this invention is not limited thereto if twisting is applied to the stabilizer by means of expansion and contraction of the hydraulic pressure cylinder unit. For example, as shown in FIG. 7, it is also appropriate that the apparatus is arranged such that the hydraulic pressure cylinder 30 is attached to the vehicle body 400 and the stabilizer is twisted through a link mechanism 401.

What is claimed is:

1. A control apparatus for use in a motor vehicle having at least a left-side wheel and a right-side wheel, comprising:

elastically twistable stabilizer means provided between said left-side and right-side wheels of said motor vehicle;

hydraulic pressure cylinder unit means coupled between one end portion of said elastically twistable stabilizer means and one of said left-side and right-side wheels, said hydraulic pressure cylinder unit means having at least one cylinder body and one piston dividing the space within said cylinder body into two chambers and slidably movable in said cylinder body so as to be expandable and contractable in accordance with slidable movements of said piston;

hydraulic pressure generator means for generating a hydraulic pressure;

hydraulic pressure actuator means including change-over valve means and coupled between said hydraulic pressure generator means and said hydraulic pressure cylinder unit means to control hydraulic pressures in said two chambers of said cylinder body using the hydraulic pressure generated by said hydraulic pressure generator means so as to allow adjusting a position of said piston, the position of said piston in said cylinder body determining the twisting amount of said stabilizer means;

steering angle sensor means for sensing a steering angle of said motor vehicle in response to a rotational movement of a steering wheel of said motor vehicle and generating a signal indicative of the sensed steering angle;

position sensor means adapted for sensing the position of said piston in said cylinder body and generating a signal indicative of the sensed piston position;

first control means responsive to said steering angle signal and said position signal from said steering angle sensor means and said position sensor means to determine a predetermined stable condition of said motor vehicle on the basis of said steering angle signal and to obtain a neutral position of said piston taken under the condition that said motor vehicle is in said predetermined stable condition, said neutral position thereof being sensed by said position sensor means; and second control means responsive to said steering angle signal to determine a turning state of said motor vehicle on the basis of said steering angle signal and to determine a target piston position with respect to the obtained neutral position of said piston in accordance with the degree of the vehicle turning state, determined by said steering angle signal, in response to the determination of the vehicle turning state, said second control means outputting a control signal to said hydraulic pressure actuator means so that said piston is controlled to assume the determined target piston position.

2. A control apparatus as claimed in claim 1, further comprising vehicle speed sensor means for sensing a speed of said motor vehicle and generating a signal indicative of the sensed vehicle speed, and wherein said first control means is further responsive to said vehicle speed signal to determine said predetermined stable condition of said motor vehicle when said motor vehicle is running straight at a predetermined speed.

3. A control apparatus as claimed in claim 2, wherein, when said motor vehicle is in said predetermined stable condition, said first control means controls said hydraulic pressure actuator means so that said piston of said hydraulic pressure cylinder unit means is freely expandable and contractable within said cylinder body thereof to be finally kept to a stable position which is in turn employed as said neutral position of said piston.

4. A control apparatus as claimed in claim 3, wherein said first control means compares the presently obtained neutral position with the previously obtained neutral position and said second control means calculates said target piston position on the basis of the presently obtained neutral position when the difference between the presently obtained neutral position and the previously obtained neutral position is smaller than a predetermined value.

5. A control apparatus as claimed in claim 3, wherein said first control means compares the presently obtained neutral position with the previously obtained neutral position and, when the difference between the presently obtained neutral position and the previously obtained neutral position is larger than a predetermined value, said second control means corrects the presently obtained neutral position on the basis of the difference therebetween and calculates said target piston position on the basis of the corrected neutral position.

* * * * *

UNITED STATES PATENT AND TRADEMARK OFFICE
CERTIFICATE OF CORRECTION

PATENT NO. : 4,892,329
DATED : January 9, 1990
INVENTOR(S) : Tetsuji KOZAKI, Mamoru SHIMAMOTO, Toshio OONUMA It is certified that error appears in the above-identified patent and that said Letters Patent is hereby corrected as shown below:

Please delete "[73] Assignees: Nippondenso Co., Ltd.; Kariya and Toyota Jidosha Kabushiki Kaisha, both of Toyota, Japan"

and insert therefor:

--[73] Assignees: Nippondenso Co., Ltd., Kariya and Toyota Jidosha Kabushiki Kaisha, Toyota, both of Japan--

Signed and Sealed this

Fifth Day of March, 1991

*Attest:*

HARRY F. MANBECK, JR.

*Attesting Officer*     *Commissioner of Patents and Trademarks*